Jan. 10, 1939.  H. H. DOERING  2,143,304
BUTTER PRINT MACHINE
Filed Oct. 21, 1936  2 Sheets-Sheet 2
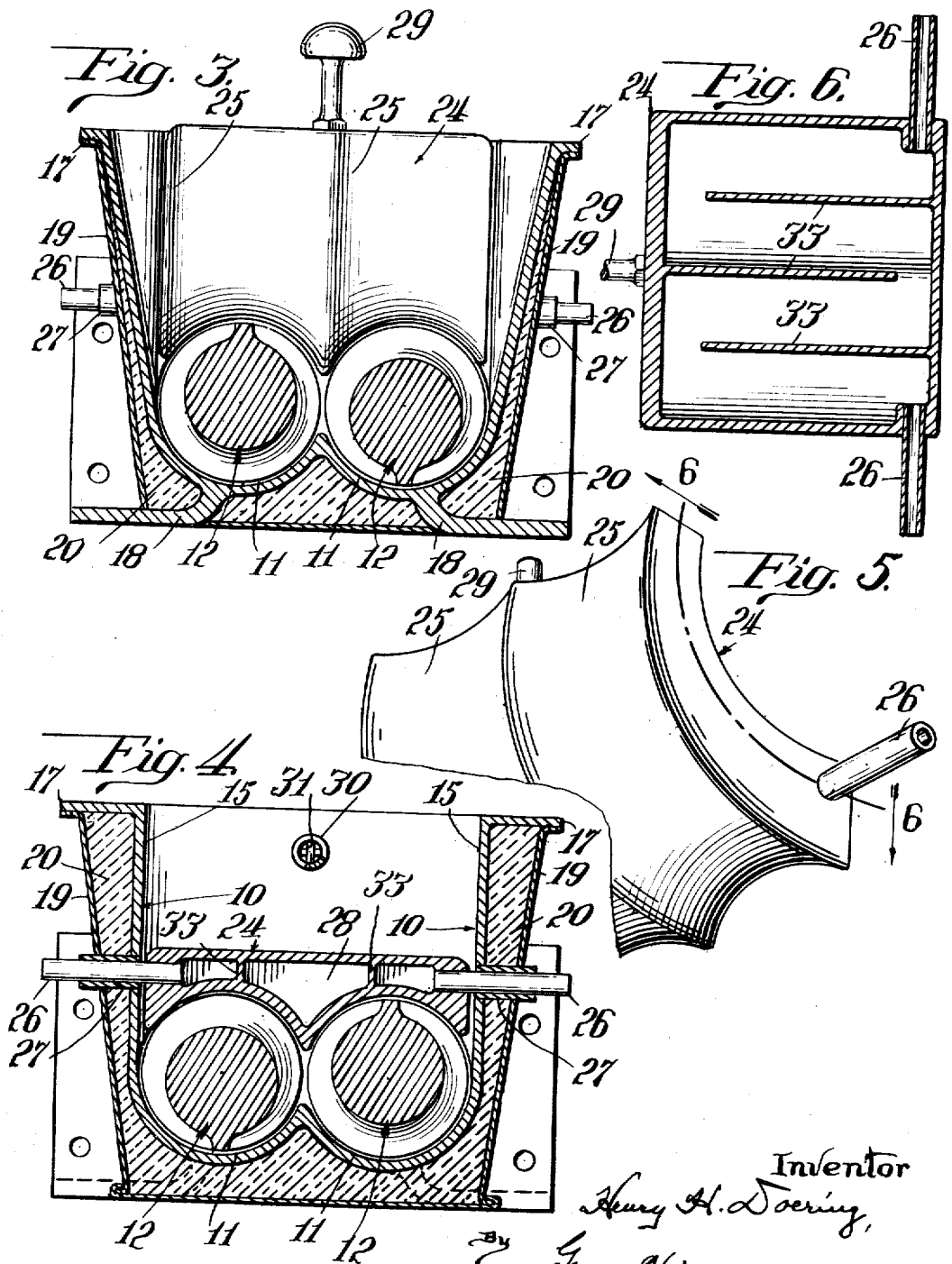
Inventor
Henry H. Doering,
By George Heideman
Attorney Patented Jan. 10, 1939

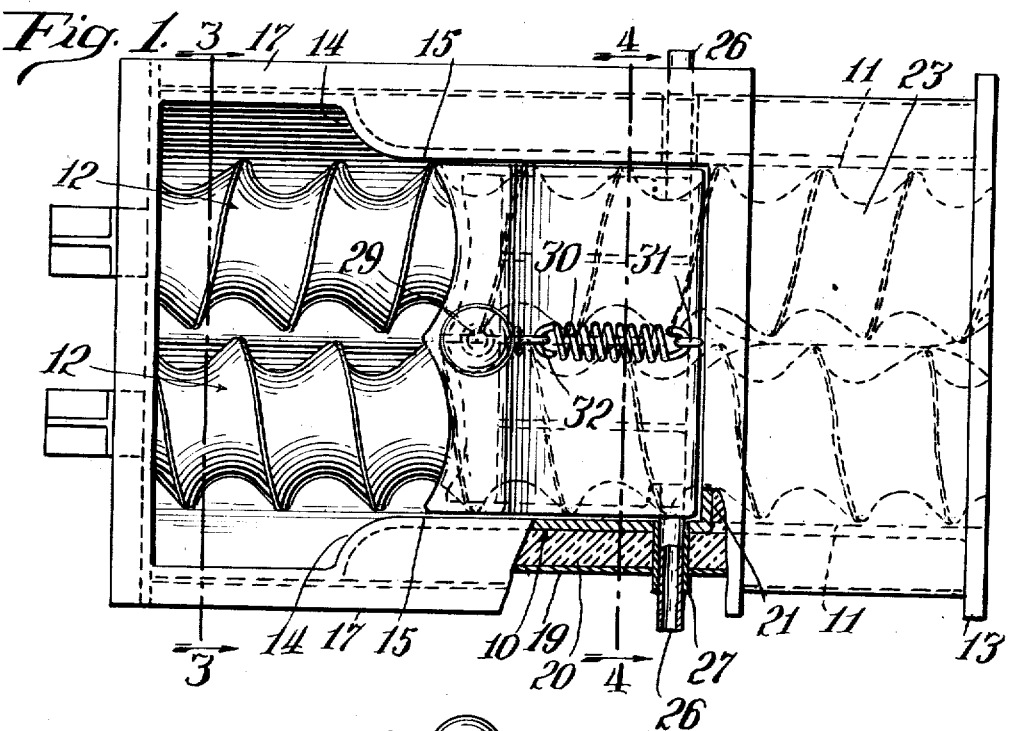
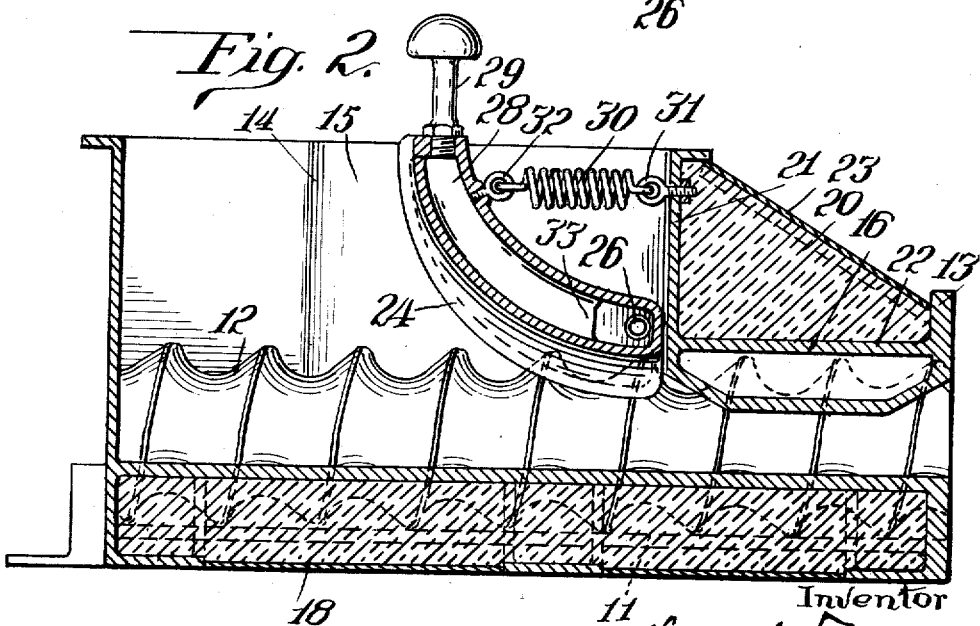

2,143,304

UNITED STATES PATENT OFFICE 2,143,304

BUTTER PRINT MACHINE

Henry H. Doering, Chicago, Ill.

Application October 21, 1936, Serial No. 106,769

11 Claims. (Cl. 31—14)

My invention relates to a butter print or moulding machine, preferably of the power operated type wherein the butter or butter substitute at the initial or charging end will normally be subjected to a yielding pressure through the medium of what may be termed a safety feed.

The invention also contemplates a butter print machine involving suitably insulated butter receiving chambers whereby the inner wall of the chamber or machine may be maintained at a sufficiently low temperature and the butter temperature also maintained sufficiently low to enable proper working of the machine and the desired working or movement of the butter obtained.

In addition to insulating the metallic walls of the machine, I also contemplate the provision of a movable or pivoted safety feed device, made to conform to the arcuate formation of the top of the butter working and feeding screws or worms, which is arranged to have a circulating medium pass therethrough whereby the butter is caused to readily slip off the safety feed device and into the throat of the print forming portion of the machine.

Another object of my invention is the provision of a butter print machine made of metal whereby a non-shrinking, non-checking, and more sanitary butter print machine may be provided and any suitable insulating medium may be used whereby the desired temperature of the butter receiving chamber may be obtained and maintained.

The above enumerated objects of my invention, as well as other objects and advantages inherent in the construction, will all be more readily comprehended from the following detailed description of the accompanying drawings, wherein:

Figure 1 is a top plan view of my improved machine with a portion broken away and shown in section.

Figure 2 is a central longitudinal sectional view of the same.

Figure 3 is a vertical cross sectional view taken substantially on the line 3—3 of Figure 1, looking in the direction of the arrows.

Figure 4 is a similar view taken substantially on the line 4—4 of Figure 1, looking in the direction of the arrows.

Figure 5 is a detail view of the safety feed device shown in perspective with a portion broken away.

Figure 6 is a longitudinal sectional view of the feed member and taken substantially on the line 6—6 of Figure 5.

My invention relates to a butter print machine to which the bulk butter is automatically fed into the throat of the machine to which the print forming head is attached. Butter print machines heretofore have usually been made of wood which did not readily permit of temperature control or insulation; while also being subject to shrinkage and checking, as well as to other objections.

The invention, as exemplified in the drawings, comprises any suitable standard or supporting structure, not shown, on which the butter receiving chamber is supported. The butter receiving portion consists of the main shell or metal casting 10, transversely enlarged and flared toward the top at the butter introducing end as indicated in Figure 3 and shown to the left in Figure 1; and shown provided with an integral bottom formed to provide two longitudinally extending arcuate troughs 11, 11, adapted to receive and to conform with the pair of worms 12, 12, whose initial ends are suitably journaled in openings in the end wall of the casing and protrude therethrough to be suitably coupled to the power mechanism not shown; while the other or discharge ends terminate at the end wall 13 to which the print forming head (not shown) is attached.

The side walls of the casting 10 are preferably brought closer together as shown at 14 in Figure 1, thereby providing the substantially perpendicular sides 15, 15, from a point in advance of the throat or butter compressing portion 16 of the machine.

The upper edges of the side and end walls of the initial or feeding end of the machine is shown outwardly flanged at 17; while the trough or worm-holding channel portion is provided with the integral, downwardly and laterally extending flange portions 18, 18.

In order to properly work the butter and to form the desired prints it is important that the temperature of the butter, and therefore of the machine, be sufficiently low to prevent the agitating action of the worms 12, 12 from heating the butter.

I show the main casing 10 provided with an outer wall 19, 19 arranged in spaced relation with the main shell or wall 10 intermediate of the top flange 17 and the bottom flanges 18, see Figures 3 and 4; the outer metallic wall 19, at the junctures with the main casing 10 being integrally united or soldered to provide air tight, as well as water-tight or insulation holding chambers.

Any suitable medium for producing the desired low temperature may be employed; as for example a dry insulating medium such as cork, indicated at 20, may be used; the entire chamber or space intermediate of the main walls 10 and the outer shell 19 being properly filled with the insulation.

The throat or delivery end 16 of the machine is of less vertical dimensions, produced by an intermediate or transverse wall 21 which terminates at bottom in the longitudinally disposed wall 22 arranged in close proximity to the screws or worms 12, as shown in Figure 2.

This throat portion of the machine at the upper side is provided with the outer shell section or metallic wall 23, which is preferably integrally united with the main wall by soldering or otherwise; and the chamber filled with suitable insulating material as indicated at 20.

It has been found in practice, and particularly under certain working conditions, that the butter has a tendency to adhere at the throat and thus clog the passage therethrough, thereby destroying the desired uniformity and positiveness. In order to force the butter into positive feeding contact with the worms, operators were compelled to use suitable paddles or implements, frequently having fingers caught by the worms. In order to provide a more positive feed and at the same time a safe and more sanitary method, I provide the movable compressor member 24 which is pivotally mounted at its lower end so as to swing through the arc of a vertically disposed circle.

The compressor or feed member 24 is preferably of metal, curving upwardly from its lower end, with its butter engaging side transversely undulated or formed with a double concavity conforming more or less with the tops of the worms 12.

That is to say, member 24 on each side of its longitudinal median line is dished or concaved as shown at 25, 25, see Figure 5, in order that the feed control member 24 may be brought into close relation with the tops of the feed worms 12, 12, when occasion requires.

The member 24 is pivotally mounted at its lower end by means of the hollow trunnions or nipples 26, 26, which are journaled in the sleeves or bushings 27, 27, secured in the side walls of the main casing 10 and also preferably extending through the outer shell or walls 19 as shown; the sleeves or bushings being also preferably intimately secured to the casing walls and outer walls so as to prevent ingress of air into or egress from the insulation chamber.

The feed member 24 preferably consists of a hollow or chambered casting whereby a water receiving chamber 28 is provided, with which the hollow trunnions or nipples 26, 26 communicate. With this arrangement, water of the required temperature, is introduced through one nipple 26 and discharged from the feed member through the other nipple 26, thus permitting a constant circulation of the tempering water or other medium to be maintained.

The feed member is made with the upward curvature so as to gradually subject the butter to compression in the event it is found necessary to prevent clogging at the entrance to the throat portion 16 of the machine.

The upper free end of the feed member 24 is provided with a suitable handle as at 29, whereby the operator is enabled to properly depress the free end of member 24 against the action of spring 30 whereby member 24 is returned to and held in its normally elevated position illustrated in Figure 2. The spring 30,—which is preferably of the coil type,—has one end secured to an eye-bolt 31, fastened in the intermediate transverse wall 21, while the other end of the spring is secured to the feed member by suitable means, such as the eye member 32. The spring is preferably secured adjacent the upper end of the feed member where its action is more effective in returning the water filled member 24 to its normal position shown in Figure 2.

By concaving the butter engaging side of the feed member, as shown and described, enables the sides of member to move in close relation to the side walls 15, 15 of the main casing 10, as more clearly shown in Figure 4, thus preventing the butter crawling or crowding upwardly along the sides of the machine.

The feed member 24 is shown pivotally mounted adjacent the vertically disposed intermediate wall 21, with the result that the lower and comparatively wide end of member 24 will abut the wall 21 and thereby provide a stop for the action of the spring and prevent the too far upward swing of the feed member.

In order that the tempering medium or water will be prevented from flowing directly through the feed member 24 and so it may be properly effective, I provide the feed member chamber 28 with a number of spaced apart partitions or baffles 33, as shown in Figure 6. Two of the baffles extend from the pivoted or nipple end of the member 24 and terminate short of the other end wall of the member; while the third or intermediate baffle extends from the last mentioned end wall toward and terminates short of the pivoted end of member 24. This forces the tempering medium or water to flow in a circuitous manner from one nipple to the other and causes the entire feed member 24 to be brought to the desired temperature.

The specific exemplification of my invention is adapted to overcome certain objections encountered with butter print machines as heretofore constructed; and while I believe the form shown to be the best embodiment of the invention, certain modifications may be made without, however, departing from the spirit of my invention.

What I claim is:

1. A butter print machine comprising a main shell or casting having sides, ends and bottom walls, the bottom wall being formed to provide a pair of longitudinally disposed arcuate channels extending from end wall to end wall, the side and end walls at top being flanged outwardly, while the bottom wall is provided with downwardly and outwardly extending supporting flanges; a pair of feed worms disposed in said arcuate channels; and outer metallic walls secured to the side and end wall flanges and to the bottom wall flanges so as to provide hermetically sealed chambers about the main shell.

2. In a butter print machine of the class described, a main metallic shell or casting consisting of integral sides, ends and bottom walls, the latter being provided with downwardly and outwardly extending supporting flanges, the side walls at the initial or butter feeding end flaring outwardly toward the top, while the side walls in advance of the delivery end of the machine are vertically disposed; the sides and bottom walls being provided with hermetically sealed insulating chambers.

3. In a butter print machine provided with a pair of feed worms along the bottom and a restricted throat or butter compressing outlet, a feed member pivotally mounted at its lower end in the machine above the feed worms so as to swing downwardly onto the butter and thereby compress the introduced butter into operative relation with the worms.

4. In a butter print machine provided with a pair of feed worms along the bottom and having a butter compressing throat or outlet, a feed member movably mounted in the machine above the feed worms, the butter engaging side of said member being transversely undulated to approximate the curvature of the feed worms and adapted to compress the butter into operative relation with the worms.

5. In a butter print machine provided with a pair of feed worms parallelly arranged on the bottom of the machine, a chambered feed member pivotally secured to swing vertically toward the feed worms; and means whereby a tempering or cooling medium may be introduced into the chamber of the feed member.

6. In a butter print machine provided with a pair of feed worms arranged parallelly along the bottom of the machine, a chambered feed member pivotally secured at its lower end in the butter receiving chamber of the machine so as to swing downwardly toward the feed worms, the pivots of said member consisting of hollow trunnions whereby a tempering or cooling medium may be introduced into said member.

7. In a butter print machine provided with a pair of feed worms arranged parallelly along the bottom of the machine, a chambered feed member pivotally secured at its lower end in the chamber of the machine so as to swing downwardly toward the feed worms, the butter engaging side of said member being transversely undulated to approximate the curvature of the feed worms, the pivots of the member consisting of hollow trunnions extending into the chamber of the member whereby a tempering or cooling medium may be circulated through said member.

8. In a butter print machine provided with a pair of feed worms arranged parallelly along the bottom of the machine, a feed member pivotally secured at its lower end in the chamber of the machine so as to swing downwardly toward the feed worms, the upper end of the member being provided with a hand-grasping portion; and means whereby the member is automatically returned to normal position.

9. In a butter print machine provided with a pair of feed worms arranged parallelly along the bottom of the machine, a feed member pivotally secured to the walls of the machine so as to swing downwardly toward the feed worms, the butter engaging side of the member being transversely undulated to approximate the curvature of the feed worms; and means whereby the member is automatically returned to normal position.

10. In a butter print machine provided with a pair of feed worms parallelly arranged in its bottom, a feed member pivotally secured to the walls of the machine so as to swing toward the feed worms; and spring means operative intermediate of a wall of the machine and of the member whereby the member is automatically returned to normal position.

11. In a butter print machine provided with feed worms arranged on the bottom; a chambered feed member movably mounted above the feed worms and adapted to force the butter into intimate relation with the worms; means whereby a tempering medium may be fed through said member; and means within the chamber of said member whereby the tempering medium is given an indirect path and caused to circulate throughout the chamber in said feed member.

HENRY H. DOERING.